United States Patent Office 3,040,575
Patented June 26, 1962

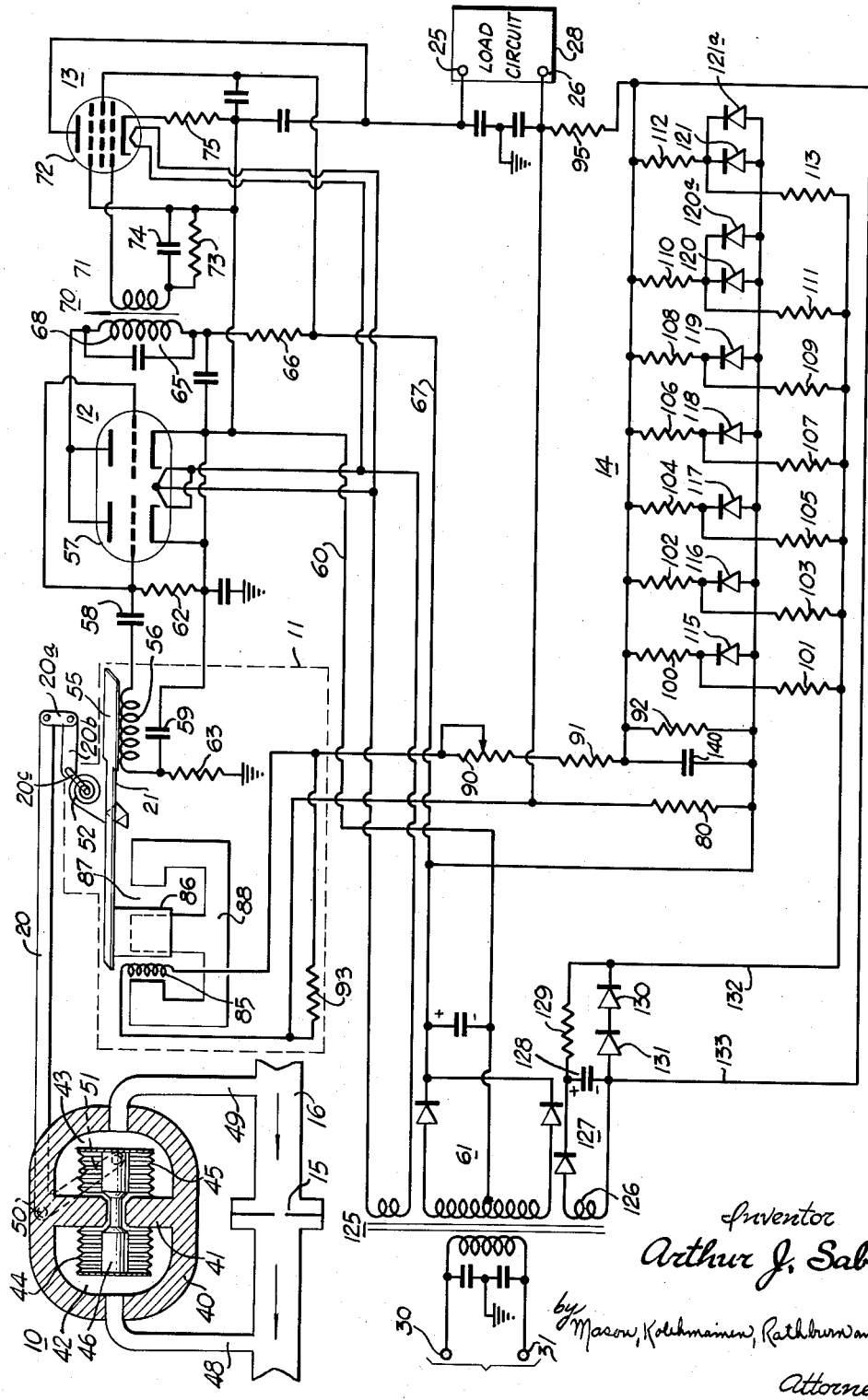

3,040,575
LINEAR FLOW TRANSMITTER
Arthur J. Sable, Milford, Conn., assignor, by mesne assignments, to Robertshaw-Fulton Controls Company, Richmond, Va., a corporation of Delaware
Filed May 20, 1957, Ser. No. 660,244
5 Claims. (Cl. 73—211)

The present invention relates to the primary measuring elements of industrial process control systems, commonly called transmitters, and, more particularly, to a transmitter which is arranged to provide a direct current electrical output signal which is responsive to the linear flow of the measured medium. While the transmitter of the present invention is of general utility, it is particularly suitable for use in an automatic process control system of the type shown and described in detail in a copending application of Charles G. Roper and Edgar S. Gilchrist, Serial No. 389,564, filed November 2, 1953, now Patent No. 2,949,273, which is assigned to the same assignee as the present invention.

In present day industrial control systems there are several different arrangements which are generally employed in the measurement of flow. According to one such arrangement, the differential pressure drop across an orifice positioned in the flow stream is measured and the transmitter develops an output proportional to differential pressure. However, this differential pressure output is not directly proportional to the flow rate but instead is proportional to the square of the flow rate and additional apparatus is required, usually in the control area, to convert the differential pressure output signal to one proportional to flow. Another arrangement employs a device commonly referred to as a rotameter wherein a weight or bob is positioned in a vertical run of pipe and is pushed upwardly in proportion to the rate of flow so as to give a linear indication of the flow rate by the position of the bob. This latter arrangement suffers from the disadvantage that a vertical run of pipe must be provided at each flow measurement point. Other arrangements for providing linear flow outputs suffer from similar mechanical disadvantages and also do not provide a direct current output signal which can be employed in an electrical process control system.

It is, therefore, a primary object of the present invention to provide a new and improved flow transmitter which is adapted to provide a direct current electrical output which is linearly proportional to the flow rate.

It is a further object of the present invention to provide a new and improved flow transmitter which is completely self contained and may be located in the process area and which provides an electrical output signal which is linearly and directly related to the flow rate of the measured medium.

It is a still further object of the present invention to provide a new and improved flow transmitter of the electronic type wherein an electrical output signal proportional to the flow rate is provided in a simple, economical and reliable manner.

A further object of the present invention resides in the provision of a new and improved flow transmitter wherein an electrical output signal is developed which is proportional to the square root of differential pressure across an orifice positioned in the flow stream.

Briefly, in accordance with one phase of the invention, a differential pressure measuring means is employed wherein the output member of the differential pressure measuring means provides movement which is proportional to differential pressure and an electromechanical force balance unit is mechanically connected to the output member of the differential pressure measuring means so that torque is applied to the pivotally mounted beam of the electromechanical force balance in proportion to differential pressure. A direct current output signal is developed in response to position of the beam and a feedback coil is mounted on the beam and positioned in a magnetic field. A diode and voltage divider network is employed in the feedback path of the transmitter so that a feedback current is applied to the feedback coil which is approximately proportional to the square of the direct current output signal of the transmitter. With this arrangement the direct current output signal of the transmitter is directly proportional to the flow rate of the measured medium and the output of the transmitter may be supplied to any suitable indicator, recorder, controller or may be supplied to a suitable integrator to obtain total flow in a simple and reliable manner.

The invention, both as to its organization and method of operation, together with further objects and advantages thereof, will best be understood by reference to the following specification taken in connection with the accompanying drawing in which:

The single FIGURE of the drawing is a schematic diagram of a flow transmitter embodying the features of the present invention.

Referring now to the drawing, the flow transmitter of the present invention is therein illustrated as comprising a differential pressure measuring element, indicated generally at 10, an electromechanical force balance unit indicated generally at 11, an oscillator circuit indicated generally at 12, a detector and amplifier circuit indicated generally at 13 and a square approximating feedback circuit indicated generally at 14. Generally considered, the differential pressure measuring element 10 is arranged to measure the differential pressure across an orifice 15 which is positioned in the pipe 16 through which the measured medium flows and the element 10 is provided with an output member 20 which is connected to the pivotally mounted beam 21 of the electromechanical force balance unit 11. The units 11, 12 and 13, together with the feedback squaring circuit 14 function to provide a direct current output signal at the output terminals 25 and 26 of the transmitter which is proportional to the square root of differential pressure and hence directly proportional to the rate of flow through the pipe 16. The output terminals 25 and 26 are thus adapted to be connected by way of suitable transmission lines (not shown) to a load circuit 28 which is located in the control area, this load circuit comprising any suitable indicator, recorder, controller, or, in the case of total flow measurement the output of the transmitter may be connected to a suitable integrating device to obtain a direct measurement of total flow. The electrical circuits of the transmitter are energized from a suitable 115 volt alternating current source which is connected to the input terminals 30 and 31 of the transmitter so that a self contained flow transmitter unit is provided which may be located in the process area, is energized by applying power plant alternating current to the input terminals 30 and 31 and provides at the output terminals 25 and 26 a direct current output signal which is linearly related to the flow rate of the measured medium.

Considering now the differential pressure measuring element 10, this element may be of any suitable commercial type and comprises a housing 40 having a transverse partition 41 which separates the housing 40 into the chambers 42 and 43. A pair of bellows 44 and 45 are interconnected by means of a pivoted transverse member 46 so that as the upstream and downstream pressures in the inlet lines 48 and 49 vary the transverse member 46 is moved laterally in accordance with the pressure differential in the chambers 42 and 43. The output member 20 forms a part of a bell crank lever which is pivotally secured to the housing 40 at 50, the other end of this bell crank 51 being connected to the transverse member 46 so that as the differential pressure changes the outer end of the member 20 moves up and down. The outer end of the member 20 is connected through the linkage 20a and 20b to a rotatable shaft 20c which is mounted in line with the pivotal axis of the beam 21 and is connected to the beam 21 through the coiled spring 52 so as to apply an input torque proportional to differential pressure to the beam 21. The position of the shaft 20c may be adjusted relative to the link 20b to provide a zero adjustment for the instrument.

In connection with the electromechanical force balance unit 11, it is pointed out that this unit may comprise any suitable pivoted beam arrangement for translating movement of the output member 20 into a corresponding variation in electrical reactance and wherein suitable feedback means are provided for applying a force to the beam in opposition to the input force applied to the member 20. Preferably, the unit 11 is constructed as described in detail in a copending application of Edgar S. Gilchrist and Arthur J. Sable, Serial No. 616,485, filed October 17, 1956, now Patent No. 2,913,672, and reference may be had to this copending application for a detailed description of such unit. However, for the purposes of the present invention, it may be stated that the beam 21 is provided with a planar control element 55 which is positioned adjacent a stationary inductance coil 56 so that movement of the beam 21 produces a variation in the inductance of the coil 56. The coil 56 is included in the grid circuit of an electronic oscillator which includes the double triode vacuum tube 57, preferably of the commercial type 12AT7, one end of the coil 56 being connected through the condenser 58 to the parallel connected control grids of the two sections of the tube 57 and the other end of the coil 56 being connected through the condenser 59 to the cathodes of the two sections of the tube 57, these cathodes also being connected to the negative conductor 60 of a full wave selenium rectifier power supply indicated generally at 61. A grid leak resistor 62 is connected between the control grid and cathode of the two sections of the tube 57. Also, the coil 56 is connected to ground through the resistor 63 to prevent electrostatic forces from affecting the position of the beam 21, as described in more detail in the copending application, Serial No. 389,564, now Patent No. 2,949,273, referred to heretofore. The anodes of the two sections of the tube 57 are connected together and through the anode tuned circuit 65 of the oscillator and the decoupling resistor 66 to the positive conductor 67 of the power supply 61.

The inductive branch 68 of the tuned circuit 65 forms the primary of a coupling transformer indicated generally at 70, the secondary winding 71 of which is connected to the control grid of a detector amplifier tube 72, preferably of the commercial type 6AU6 and a detector load network including the resistor 73 and condenser 74 is connected from the bottom end of the secondary winding 71 to the negative power supply conductor 60 so as to provide a grid leak detector action for the oscillator signal developed across the secondary winding 71. An unbypassed cathode resistor 75 is connected from the cathode of the tube 72 to the negative conductor 60 and the screen grid of the tube 72 is energized directly from the positive conductor 67, the suppressor grid of the tube 72 being also connected to the negative conductor 60. The anode of the tube 72 is connected to the output terminal 25 and the output terminal 26 is connected through the load resistor 80 of the tube 72 to the positive supply conductor 67. Accordingly, the direct current output signal developed at the anode of the tube 72 flows through the load circuit 28 connected to the terminal 25, 26 and through the resistor 80.

The oscillator 12 is operated Class A so that plate current flows continuously through the tube 57 and the D.C. component of this plate current does not vary. However, the amplitude of the R.F. voltage developed by the oscillator 12 does vary in accordance with the position of the beam 21. This R.F. voltage is rectified in the grid circuit of the tube 72 and is amplified in this tube so that a circuit arrangement is provided which is extremely sensitive to changes in the position of the beam 21. It has been found that this circuit arrangement is more sensitive than a Class C oscillator bridge circuit arrangement by a factor of approximately 15 to 1.

In the force balance unit 11, there is provided a feedback coil 85 which is positioned on the coil form 86 mounted on the beam 21, the coil 85 being positioned within an annular air gap 87 formed in the magnetic structure indicated diagrammatically at 88. Accordingly, current flow through the feedback coil 85 produces a force on the beam 21 which is in opposition to the input force applied through the member 20 so that the beam is rebalanced.

In accordance with an important phase of the present invention, a current is applied to the feedback coil 85 which is approximately proportional to the square of the direct current output signal which is supplied to the output terminals 25, 26, this approximate squaring function being provided by the squaring circuit 14. More particularly, the bottom end of the feedback coil 85 is connected through the span adjustment potentiometer 90 and a resistor 91 to the upper end of a current dividing resistor 92, the bottom end of which is connected to the positive supply conductor 67. The upper end of the feedback coil 85 is connected to the output terminal 26, a resistor 93 being connected across the feedback coil 85 internally of the unit 11 and a resistor 95 being connected from the output terminal 26 to the junction of the resistors 91 and 92 for temperature compensation purposes, as will be described in more detail hereinafter.

Considering now the manner in which the squaring circuit 14 functions to provide the desired square law characteristic, it will be noted that the squaring circuit 14 is contained in the feedback loop of a high gain amplifier which includes the oscillator 12 and the amplifier 13. Accordingly, if the gain of the oscillator and amplifier portions of the transmitter is very high, a very small change in input to the beam 21 will be required to provide the desired change in direct current output so that the input and feedback torques applied to the beam 21 will be almost equal to one another. However, since the feedback torque is made to be proportional to the square of the output current, the net effect is to provide a direct current output signal at the terminals 25, 26, which is proportional to the square root of the input torque applied to the beam 21. Since this input torque is itself proportional to differential pressure, the output current developed at the terminals 25, 26 is thus linearly proportional to the rate of flow of the measured medium.

The squaring circuit 14 produces the desired square law characteristic by approximating a true parabolic curve by means of a relataively small number of straight line segments which are chords of the desired characteristic. The number of segments required will depend upon the maximum permissible deviation from the desired parabolic characteristic. However, because the transmitter is employed to measure flow within certain limits of accuracy, although the input torque applied to the beam 21 is proportional to differential pressure, the important deviation of the segment from the desired characteristic is in the direction corresponding to flow. Thus, if the transmitter is to have an output proportional to flow within 0.5 percent accuracy, the accuracy with respect to differential pressure, at one end of the scale, must be considerably greater. Since the input to the squaring circuit 14 is proportional to flow, the maximum permissible error or deviation of each segment from the desired characteristic is with respect to the input of the squaring circuit rather than with respect to the output as in conventional circuits of this type.

In order to use the most economical number of segments for a given accuracy of curve approximation, where the error between the true curve and the segmented approximation is defined as the difference between the two in terms of the current corresponding to flow, the chords are so chosen that the maximum deviation between each chord and its arc is equal to the maximum allowable current flow error. By selecting the end-points of the chords in this manner, it has been found that chords of shorter length are necessary as the radius of curvature of the parabola decreases, i.e., the distance between intercepts of chords and curve are closer together at the bottom of the scale than they are at the top. It has been determined analytically that seven straight line segments are sufficient to approximate the desired curve from 10% to 100% of full scale flow with 0.5% accuracy, and an eighth segment can be used to approximate that part of the curve from zero to 10% with reduced accuracy.

If the output of the transmitter is designed to vary over a range from 1.0 to 5.0 milliamperes corresponding to zero to 100% of flow, and the full-scale feedback current change, proportional to the square of the transmitter output current, is designed to be 1.6 milliamperes, the coordinates of the ends of the segments, given in microamperes, are as follows:

| Output Current | Feedback Current |
|---|---|
| 0 | 0 |
| 1,400 | 56.0 |
| 1,675 | 85.6 |
| 2,030 | 146.1 |
| 2,465 | 254.7 |
| 2,980 | 432 |
| 3,575 | 703 |
| 4,250 | 1,096 |
| 5,000 | 1,640 |

The above described series of straight line segments is generated by means of the squaring circuit 14 which consists of a plurality of voltage divider networks which are selectively connected in parallel with the resistor 92 by means of a plurality of biased silicon diodes. More particularly, the voltage divider networks 100, 101; 102, 103; 104, 105; 106, 107; 108, 109; 110, 111; and 112, 113 are provided which are connected in circuit with the resistor 92 by means of the diodes 115 to 121, inclusive, the diodes 120 and 121 having the additional diodes 120a and 121a connected thereacross to provide reduced forward diode resistance for the last two segments. All of these voltage divider networks are energized from a common well-regulated voltage supply. More particularly, the power transformer 125 of the transmitter is provided with a separate winding 126 which supplies alternating current to a half wave selenium rectifier circuit 127, the voltage developed across the filter condenser 128 being supplied to a series dropping resistor 129 and a pair of reverse connected silicon diodes 130 and 131. The diodes 130 and 131 are operated in the Zener voltage breakdown region so that a high degree of regulation is provided for the voltage developed between the conductors 132 and 133, this regulated voltage being impressed upon all of the above described voltage divider networks in parallel. Specifically, the diodes 130 and 131 operate on the principle that an inversely biased p-n junction of semiconductors shows a predictable, well defined (Zener) breakdown voltage. In this region the current in the inverse direction rises rapidly with a slight increase in voltage and a particular, characteristic voltage drop appears across the junction which is maintained over a relatively wide range of current values.

Considering now the operation of the above described biased diodes and voltage divider networks, for low signal levels all of the diodes 115 to 121a, inclusive, are biased against conduction by their associated voltage divider networks which are connected to the cathodes of the respective diodes. Accordingly, the resistor 92 alone determines the current flow through the feedback coil 85 and hence the slope of the first straight line segment of the square law approximating characteristic. However, when the current through the resistor 92 increases to a value sufficient that a first diode 115 is rendered conductive, the resistors 100 and 101 are effectively connected in parallel with the resistor 92 so as to change the effective current division between the resistor 80 and the resistor 92 and hence the current through the feedback coil 85 is varied in accordance with a different slope of output vs. input in accordance with the next desired straight line segment of the square law approximating characteristic. In a similar manner, the diodes 116, 117, etc., are selectively rendered conductive as the signal level increases so that the slope of the square law approximating characteristic is successively increased, the value of this slope being determined by the values of all of the resistors connected in parallel with the resistor 92 for a particular straight line segment. The resistors in the voltage divider network are thus chosen to determine the end points of the straight line segments of the characteristic and are also chosen so that the overall resistance in circuit gives the desired slope for that particular straight line segment. The resistors of the voltage divider network are also chosen so that their values are large with respect to the forward resistance characteristics of the biasing diodes 115 to 121a, inclusive, and are also chosen to have resistance values which are low with respect to the reverse resistance of the biasing diodes so that individually adjustable potentiometers for each voltage divider network are not required.

The gain provided by the oscillator 12 and the detector amplifier 13 is sufficient so that the input and feedback torques are substantially larger than the error signal at low outputs when there is little negative feedback to the coil 85 while, at the same time, the gain in this forward portion of the transmitter must not be so high at low output levels when there is little negative feedback that instability or hunting is produced. In order to satisfy these conditions, it has been found necessary to provide a condenser 140 which is connected across the resistor 92 so that a network having a leading voltage component is provided in the squaring circuit 14 for added system stability at high output levels.

In order to compensate for variations in the regulated voltage developed between the conductors 132 and 133 by the Zener diodes 130, 131 with changes in temperature, and also to provide temperature compensation for the temperature coefficient of the zeroing spring 52 provided in the electromechanical balance unit 11, there is provided a temperature sensitive resistance network which includes the resistors 91, 93 and 95 and the potentiometer 90. The resistor 93 is of the copper type and is shunted across the coil 85 to provide damping, this damping being substantially constant because both the coil 85 and the resistor 93 are of copper. The resistor 95 is also of the copper type and the resistor 91 and potentiometer 90 are both of manganin and have a zero temperature coefficient. As the temperature increases the resistance of resistor 95 increases faster than the resistance of the parallel branch which includes the coil 85 and the resistors 90 and 91. Accordingly, as the temperature increases the resistor 95 has less shunting effect on this parallel branch and the current through the coil 85 increases to cancel the effects of weakening of the spring 52 and a decrease in the voltage developed by the Zener diodes 130, 131 with increasing temperature. The potentiometer 90 acts as a span adjustment for the feedback coil 85 so as to provide the desired range of feedback coil current corresponding to predetermined range of input torques.

By way of example only, it has been found that a straight line segment squaring circuit 14 having an accuracy of 0.5% over the range of 10% to 100% of full scale flow is provided when Type 1N137a silicon diodes are employed as the biased diodes 115 to 121, inclusive, with a feedback coil 85 resistance of 100 ohms, a stabilized voltage of forty volts between the conductors 132 and 133, and the following circuit constants:

Resistor:

| | | |
|---|---|---|
| 80 | ohms | 11,500 |
| 91 | do | 68 |
| 92 | do | 276,000 |
| 93 | do | 300 |
| 95 | do | 220 |
| 100 | do | 231,000 |
| 102 | do | 244,000 |
| 104 | do | 188,000 |
| 106 | do | 160,000 |
| 108 | do | 127,000 |
| 110 | do | 111,000 |
| 112 | do | 85,000 |
| 101 | do | 368,000 |
| 103 | do | 291,000 |
| 105 | do | 160,000 |
| 107 | do | 92,200 |
| 109 | do | 46,600 |
| 111 | do | 24,300 |
| 113 | do | 8,800 |
| Potentiometer 90 | do | 75 |
| Condenser 140 | microfarad | 0.1 |

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and is desired to be secured by Letters Patent of the United States is:

1. A linear flow transmitter for developing an electrical output signal proportional to rate of flow of a measured medium, comprising differential pressure measuring means provided with an output member movement of which is proportional to differential pressure across an orifice positioned in the flow stream, an electromechanical force balance unit including a pivotally mounted beam, means for applying an input force to said beam proportional to movement of said output member, means responsive to movement of said beam for developing a direct current output signal, a feedback coil mounted on said beam and positioned in a magnetic field, means for deriving from said direct current output signal a direct current feedback current which is approximately proportional to the square of said direct current output signal, and means for impressing said feedback current on said feedback coil in such polarity that the force exerted thereby on said beam is in opposition to said input force, whereby said direct current output signal is directly proportional to the flow rate of the measured medium.

2. A linear flow transmitter for developing an electrical output signal proportional to rate of flow of a measured medium, comprising differential pressure measuring means provided with an output member movement of which is proportional to differential pressure across an orifice positioned in the flow stream, an electromechanical force balance unit including a pivotally mounted beam, means for applying an input force to said beam proportional to movement of said output member, a pair of output terminals, means responsive to movement of said beam for supplying a direct current signal to said output terminals, a resistor connected in series with said output terminals, a feedback coil mounted on said beam and positioned in a magnetic field, means connecting said feedback coil in parallel with said resistor, and means for varying the ratio of current flow through said feedback coil to current flow through said resistor in such manner that the current flow through said feedback coil approximates the square of said direct current output signal, whereby said direct current output signal is directly proportional to the flow rate of the measured medium.

3. A linear flow transmitter for developing an electrical output signal proportional to rate of flow of a measured medium, comprising differential pressure measuring means provided with an output member movement of which is proportional to differential pressure across an orifice positioned in the flow stream, an electromechanical force balance unit including a pivotally mounted beam, means for applying an input force to said beam proportional to movement of said output member, a pair of output terminals, means responsive to movement of said beam for supplying a direct current signal to said output terminals, a resistor connected in series with said output terminals, a feedback coil mounted on said beam and positioned in a magnetic field, means including a first current dividing resistor connected in series with said feedback coil, means connecting the series combination of said feedback coil and said first current dividing resistor across said resistor, a plurality of other current dividing resistors, means including a plurality of biased diodes for connecting said other current dividing resistors across said one current dividing resistor, and means for differentially biasing said diodes so that current flow through said feedback coil is approximately proportional to the square of said direct current output signal, whereby said direct current output signal is directly proportional to the flow rate of the measured medium.

4. A linear flow transmitter for developing an electrical output signal proportional to rate of flow of a measured medium, comprising differential pressure measuring means provided with an output member movement of which is proportional to differential pressure across an orifice positioned in the flow stream, an electromechanical force balance unit including a pivotally mounted beam, means for applying an input force to said beam proportional to movement of said output member, a pair of output terminals, means responsive to movement of said beam for supplying a direct current signal to said output terminals, a resistor connected in series with said output terminals, a feedback coil mounted on said beam and positioned in a magnetic field, means including a first current dividing resistor connected in series with said feedback coil, means connecting the series combination of said feedback coil and said first current dividing resistor across said resistor, a plurality of voltage divider networks, a common energizing means for said networks, means including a plurality of diodes for connecting said divider networks in electrical circuit relation with said one current dividing resistor, said networks having resistance values such that the current flow through said feedback coil approximates the square of said direct current output signal, whereby said direct current output signal is directly proportional to the flow rate of the measured medium.

5. A linear flow transmitter for developing an electrical output signal proportional to rate of flow of a measured medium, comprising differential pressure measuring means provided with an output member movement of which is proportional to differential pressure across an orifice positioned in the flow stream, an electromechanical force balance unit including a pivotally mounted beam, means for applying an input force to said beam proportional to movement of said output member, a pair of output terminals, means responsive to movement of said beam for supplying a direct current signal to said output terminals, a resistor connected in series with said output terminals, a feedback coil mounted on said beam and positioned in a magnetic field, means including a first current dividing resistor connected in series with said feedback coil, means connecting the series combination of said feedback coil and said first current dividing resistor across said resistor, a plurality of voltage divider networks, means including diode voltage regulator means for developing a regulated unidirectional voltage, means connecting said regulated voltage to all of said voltage divider networks, means including a plurality of diodes for connecting said divider networks in electrical circuit relation with said one current dividing resistor, said networks having resistance values such that the current flow through said feedback coil approximates the square of said direct current output signal, whereby said direct current output signal is directly proportional to the flow rate of the measured medium.

References Cited in the file of this patent

UNITED STATES PATENTS

| | | |
|---|---|---|
| 1,191,416 | Gibson | July 18, 1916 |
| 2,330,427 | Hornfeck | Sept. 28, 1943 |
| 2,599,288 | Schaefer | June 3, 1952 |
| 2,618,973 | Peterson | Nov. 25, 1952 |
| 2,688,253 | Markson | Sept. 7, 1954 |
| 2,751,786 | Coulbourn et al. | June 26, 1956 |
| 2,822,689 | Bonapace | Feb. 11, 1958 |
| 2,948,146 | Bergeson | Aug. 9, 1960 |